United States Patent [19]

Matsuhiro et al.

[11] Patent Number: 4,535,063

[45] Date of Patent: Aug. 13, 1985

[54] SILICON NITRIDE SINTERED BODIES AND A METHOD FOR PRODUCING THE SAME

[75] Inventors: Keiji Matsuhiro; Minoru Matsui, both of Nagoya, Japan

[73] Assignee: NGK Insulators, Ltd., Japan

[21] Appl. No.: 501,824

[22] Filed: Jun. 7, 1983

[30] Foreign Application Priority Data

Feb. 9, 1983 [JP] Japan .................................. 58-18963

[51] Int. Cl.$^3$ ............................................. C04B 35/58
[52] U.S. Cl. ........................................ 501/97; 264/65
[58] Field of Search ............................. 501/97; 264/65

[56] References Cited

U.S. PATENT DOCUMENTS 4,073,845 2/1978 Buljan et al. .......................... 501/97
4,218,257 8/1980 Ode et al. ............................... 501/97
4,304,576 12/1981 Hattori et al. .......................... 501/97

Primary Examiner—Mark L. Bell
Attorney, Agent, or Firm—Parkhurst & Oliff

[57] ABSTRACT

Silicon nitride sintered bodies having a high density, high mechanical strength and high fracture toughness, contain specific amounts of oxides or oxynitrides of Sr, Mg, a rare earth element and Zr respectively and the remainder being $Si_3N_4$, are produced by shaping a raw batch material containing compounds of each of Sr, Mg, a rare earth element and Zr in given amounts, wherein Zr is added by abrasion of the grinding media and the mixture is pressurelessly sintered in nitrogen or an inert gas atmosphere.

13 Claims, No Drawings

SILICON NITRIDE SINTERED BODIES AND A METHOD FOR PRODUCING THE SAME

BACKGROUND OF THE INVENTION

1. Field of the Invention

The present invention relates to highly densified silicon nitride sintered bodies having high mechanical strength and fracture toughness and a method for producing the same.

2. Description of the Prior Art

Silicon nitride sintered bodies have excellent mechanical strength, fracture toughness, heat resistance, thermal shock resistance and corrosion resistance and therefore, they have been extensively developed as heat resistant high strength materials.

Silicon nitride is a substance having high covalency and itself has very poor sinterability, so that in order to obtain sintered bodies having a high density, it has been known that a sintering aid, such as MgO, $Al_2O_3$, $Y_2O_3$, $ZrO_2$ and the like is generally added. That is, as already known silicon nitride sintered bodies, ones containing MgO as a sintering aid, ones containing MgO and $ZrO_2$, or ones containing $Y_2O_3$, $Al_2O_3$ and MgO have been known.

However, the prior silicon nitride sintered bodies have not always satisfied mechanical strength requirements, the fracture toughness requirements and the like. Namely, prior sintered bodies produced through a pressureless sintering process have had a four point flexural strength at room temperature of lower than 70 kg/mm$^2$ and a fracture toughness of lower than 6 MN/m$^{3/2}$ and sintered bodies having improved properties have been required as high strength materials.

As the sintering process for obtaining silicon nitride sintered bodies having high density, a pressureless sintering process and a sintering process under high pressure have been known.

The sintering process under high pressure positively applies mechanical pressure for densifying the sintered body and can provide articles having high density, but it is difficult to produce articles having complicated shapes. Further the productivity is poor and the firing installation is complicated. This results in higher production costs.

On the other hand, the pressureless sintering process can produce more easily and cheaply articles having complicated shapes than the sintering process under high pressure and therefore is high in commercial value, but for the densification, it is necessary to make the grain size of the raw material powder more fine; to increase an amount of the sintering aid; and to raise the firing temperature. However it is impossible to obtain articles having such high density and strength as in the sintered bodies obtained in the high pressure process.

SUMMARY OF THE INVENTION

The present invention aims to obviate these prior defects and to obtain silicon nitride sintered bodies having high density, high strength and high fracture toughness and a method for producing easily and cheaply silicon nitride sintered bodies by a pressureless sintering process.

The present invention lies in silicon nitride sintered bodies containing oxides or oxynitrides of Sr, Mg, a rare earth element and Zr in an amount of 0.1–15% by weight of Sr, Mg and a rare earth element respectively, 0.1–11% by weight of zirconium element and the remainder being $Si_3N_4$ of not less than 70% by weight, and a method for producing silicon nitride sintered bodies by shaping a raw batch material containing compounds of each element of Sr, Mg, a rare earth element and Zr as sintering aids in an amount of 0.1–18% by weight calculated as SrO, an amount of 0.2–25% by weight calculated as MgO, an amount of 0.1–19% by weight calculated as an oxide of trivalent rare earth element, an amount of 0.1–15% by weight calculated as $ZrO_2$ and the remainder being not less than 70% by weight of raw material powder of silicon nitride and firing the shaped body in nitrogen or an inert gas atmosphere.

DESCRIPTION OF THE PREFERRED EMBODIMENTS

The present inventors have found that when a second phase consisting of the given amounts of oxides or oxynitrides of Sr, Mg, a rare earth element and Zr in the grain boundary of $Si_3N_4$ crystal is formed in the course of firing, the compounds of Sr, Mg, a rare earth element and Zr and $Si_3N_4$ synergistically develop the activity for promoting the densification and the effect of controlling the microstructure, whereby silicon nitride sintered bodies having particularly excellent mechanical strength and fracture toughness can be obtained. Furthermore, it has been found that the method for producing such sintered bodies can be firstly attained by firing a raw batch material containing the given amounts of the specifically defined sintering aid in silicon nitride raw material powder in nitrogen or an inert gas. The term "oxynitrides" used in the present invention means crystalline or amorphous compounds in which a cation is a metal element and an anion is oxygen and nitrogen, which are produced by reacting a single or plurality of metal oxides with $Si_3N_4$ or nitrogen gas.

The term "zirconia ceramics" used in the present invention means a sintered body consisting of $ZrO_2$, zirconia sintered body containing CaO, MgO, $Y_2O_3$, $CeO_2$, etc. as a stabilizer or zirconia sintered body additionally containing $SiO_2$, $Al_2O_3$, etc. as a sintering aid together with such a stabilizer.

A more detailed explanation will be made with respect to silicon nitride sintered bodies of the present invention. The sintered bodies contain oxides or oxynitrides of each element of Sr, Mg, a rare earth element, preferably Ce or Y in an amount of 0.1–15% by weight, preferably 0.3–10% by weight as each metal element respectively, zirconium oxide or oxynitride having a crystal grain size of less than 5 μm, preferably less than 1 μm in an amount of 0.1–11% by weight as zirconium element and the remainder being not less than 70% by weight, preferably not less than 80% by weight of $Si_3N_4$.

It is considered that the reason why silicon nitride sintered bodies of the present invention have high strength and toughness, is based on the following facts.

Compounds of Sr, Mg, a rare earth element or Zr, even alone, react with $Si_3N_4$ and $SiO_2$ in a raw material of silicon nitride during firing to form an amorphous substance, which promotes the densification of the poor sintering $Si_3N_4$. However, the amorphous substances of oxides or oxynitrides concurrently containing Sr, Mg, a rare earth element and Zr have a far higher activity for promoting the densification than the activity attained by the single compound and the strength is much higher than that of an amorphous substance of the oxide or oxynitride containing the single compound. It is assumed that the oxide or oxynitride of these elements improves the strength of silicon nitride sintered body as a binder of the grain boundary of $Si_3N_4$.

It is assumed that the zirconium compound reacts with the strontium compound, magnesium compound, the rare earth element compound, $Si_3N_4$ and $SiO_2$ during sintering to promote the densification of $Si_3N_4$. Also, a part of the zirconium compound is formed as crystalline zirconia in the grain boundary to increase the fracture toughness of the silicon nitride sintered body.

The silicon nitride sintered bodies of the present invention can be produced by the following method.

A raw batch material which contains, as the sintering aid, strontium compound in an amount of 0.1–18% by weight, preferably 0.4–12% by weight calculated as SrO, magnesium compound in an amount of 0.2–25% by weight, preferably 0.5–17% by weight calculated as MgO, a compound of rare earth element, preferably Ce or Y in an amount of 0.1–19% by weight, preferably 0.4–13% by weight calculated as an oxide of trivalent rare earth element and zirconium compound in an amount of 0.1–15% by weight calculated as $ZrO_2$ and the remainder being a raw material powder of silicon nitride of not less than 70% by weight, is prepared. In this case, as the pulverizing machine, use may be made of a rotary mill, a vibratory mill, an attrition mill and the like. Wet pulverizing and dry pulverizing may be used but an amount of mixed powder, an amount of grinding balls, a liquid medium, a slurry viscosity and the like are properly selected depending upon the pulverizing system. As the liquid medium, use may be made of acetone, alcohol, water and the like. The pulverizing time varies depending upon the pulverizing process and the amount to be pulverized. However, enough time is alotted for the material to be pulverized finely divided and the resulting average grain size and BET specific surface area are saturated into given limits.

When the raw batch material is prepared, the compounds of Sr, Mg and a rare earth element may be mixed in a powder form or a solution form upon pulverizing but zirconium compound is preferably added to the raw batch material through abrasion of grinding balls made of zirconia ceramics during the pulverizing step using said grinding balls, then mixing it into the mixture of powders or solutions solution upon pulverizing.

When $ZrO_2$ is added through abrasion of the grinding balls made of zirconia ceramics, the pulverizing time is controlled so that the resultant $ZrO_2$ does not exceed 15% by weight by chemically analyzing an amount of $ZrO_2$ mixed, in addition to measurement of the average grain size and BET specific surface area.

In order to obtain a high pulverizing effect, the grinding balls made of zirconia ceramics must have a specific gravity of more than 5 and a Mohs hardness of more than 6. Therefore, the grinding balls having a content of more than 70% by weight of $ZrO_2$ are preferable. The shape of the grinding balls may be spheric, cylindrical and any other suitable shape. When the outer diameter is too small, coarse particles in the raw batch material powder are not pulverized and the strength of the sintered body is not improved, so that the outer diameter is preferred to be 3–10 mm, preferably 4–8 mm.

To the raw batch material pulverized into the given grain size is added a shaping aid, such as polyvinyl alcohol, if necessary, and after the resulting mixture is stirred, the powder or slurry is dried to obtain the shaping powder. Said powder is shaped by means of a hydrostatic press and the like into a desired shape and fired at a temperature of 1,650°–1,850° C., preferably 1,670°–1,730° C. for 0.2–5 hours, preferably 0.5–2 hours, under nitrogen or an inert gas atmosphere to obtain silicon nitride sintered body.

The raw material powder of silicon nitride may contain $\alpha$-phase or $\beta$-phase but the powder containing a larger amount of $\alpha$-phase can provide sintered bodies having higher strength. Therefore, the powder containing more than 50% by weight of $\alpha$-phase is preferred, and it is preferable that a total content of Fe, Al, Ca, Na and K as impurities is less than 3% by weight, preferably less than 1% by weight. The average grain size is less than 5 $\mu$m, preferably less than 1 $\mu$m, and the BET specific surface area is 1–50 $m^2/g$, preferably 5–30 $m^2/g$.

As the compounds of Sr, Mg, a rare earth element and Zr, use may be made of anything which can form an oxide or oxynitride through firing, for example, SrO, $SrCO_3$, $Sr(NO_3)_2.4H_2O$, MgO, $MgCO_3$, $Mg(OH)_2$, $Mg(NO_3)_2.6H_2O$, $CeO_2$, $Ce(NO_3)_3.6H_2O$, $Y_2O_3$, $Y(NO_3)_3$, $La_2O_3$, $Er_2O_3$, $ZrO_2$, $ZrO(OH)_2$, etc., which have purity of higher than 98% by weight. When adding the materials in the powder form, it is preferable that average grain size is less than 5 $\mu$m and the BET specific surface area is 1–50 $m^2/g$. While, when these compounds are added as an aqueous solution of nitrate or an alkoxide solution, and then hydrolyzed, it is necessary to remove the components which are decomposed and evaporated by calcination.

Explanation will be made with respect to the reasons for limiting the components of the present invention.

The reason why the amounts of an oxide or oxynitride of Sr, Mg and a rare earth element are 0.1–15% by weight in each element as Sr, Mg or rare earth element, an amount of zirconium oxide or oxynitride is 0.1–11% by weight as zirconium element and the reamainder is not less than 70% by weight of $Si_3N_4$, is as follows. When either one of Sr, Mg, and a rare earth element is less than 0.1% by weight, the effects of promoting the densification and controlling the microstructure which are developed by the synergistic activity of the above described four elements, are not satisfactorily obtained. Hence the high strength and the high fracture toughness are not attained. The large number of pores that remain in the sintered body reduce the mechanical strength and the fracture toughness of the body.

When either one of Sr, Mg and the rare earth elements exceeds 15% by weight or Zr exceeds 11% by weight, the properties of the second phase consisting of an oxide or oxynitride of Sr, Mg, a rare earth element and Zr, formed in the grain boundary of the $Si_3N_4$ crystal, become the same as the properties of the single element which is contained in the highest amount and the synergistic activity of the four elements cannot be developed. Particularly, zirconium oxide or oxynitride has a thermal expansion coefficient which is about three times as high as $Si_3N_4$, so that if such a substance is present in an unnecessarily large amount as the second phase in the silicon nitride sintered body, the thermal expansion coefficient of the sintered body increases and the thermal shock resistance is deteriorated. Therefore, it is preferable not to exceed 11% by weight.

The content of $Si_3N_4$ is defined to be not less than 70% by weight in order to prevent the deterioration of the excellent mechanical properties inherent to $Si_3N_4$ due to the unnecessary amount of the second phase formed in the grain boundary of the $Si_3N_4$.

In the method for producing silicon nitride sintered bodies of the present invention, the amounts of sintering aid of the compounds of Sr, Mg, a rare earth element and Zr are defined to be respectively 0.1-18% by weight calculated as SrO, 0.2-25% by weight calculated as MgO and 0.1-19% by weight calculated as an oxide of a trivalent rare earth element and 0.1-15% by weight calculated as $ZrO_2$, in order to make the amounts of oxides or oxynitrides of Sr, Mg, a rare earth element and Zr in the sintered bodies to be 0.1-15% by weight as each of Sr, Mg and a rare earth element and 0.1-11% by weight as Zr.

The rare earth element is preferred to be Ce or Y, because the sintered bodies produced by particularly using Ce or Y among rare earth elements are high in the strength and the fracture toughness. The addition of zirconium compound is more preferably conducted by introducing the given amount into the raw batch material by abrasion of the grinding balls made of zirconia ceramics when pulverizing and mixing the raw material powder of silicon nitride and the compounds of Sr, Mg and a rare earth element, than that of zirconium compound through mixing in the form of a powder or solution of said compound before or upon pulverizing. It is preferable to add $ZrO_2$ from the grinding balls because $ZrO_2$ dispersed in the raw material due to the abrasion of the surface of the grinding balls in the pulverizing step is more easily and uniformly distributed in the raw material than a zirconium compound added as a powder or solution and the raw material powder is made more fine and is uniformly mixed by the high pulverizing effect possessed by the grinding balls made of zirconia ceramics. Therefore, the raw batch material having a high sintering ability can be easily obtained in a short amount of time.

The following examples are given for the purpose of illustration of this invention and are not intended as limitations thereof.

EXAMPLE 1

Raw material powder of silicon nitride having a purity of 96% by weight, an average grain size of 0.7 μm and a BET specific surface area of 8.5 m²/g, was mixed with the sintering aids having a purity of 98-99% by weight and an average grain size of 0.5-2.0 μm in the mixing ratio shown in Table 1. In order to prevent admixture of impurities, grinding balls of 7 mm diameter having the iron surface coated with nylon resin, were used. To 200 g of the raw material powder were added 500 ml of acetone and 500 g of the grinding balls in a vessel having an inner capacity of 1.2 l and made of nylon resin and the pulverizing was effected in a rotary mill of a rotation rate of 100 r.p.m. for 300 hours. After the resulting powder was dried and then shaped through hydrostatic press under a pressure of 3 ton/cm² into 60×60×6 mm and the shaped body was pressureless sintered at 1,700° C. for 1 hour in nitrogen gas to obtain silicon nitride sintered bodies (Sample No. 1-No. 14) of the present invention.

Furthermore, sintered bodies (Sample No. 15-No. 23) of comparative examples which were made with mixtures outside of the limits of the present invention, were prepared under the same conditions as in the present invention and the prior samples (No. 24-No. 25) were prepared. With respect to these sintered bodies, the bulk density, strength and fracture toughness were measured and compared and the obtained results are shown in Table 1. The strength means the four point flexural strength following to JIS R-1601 "Testing Method for Flexural Strength (Modulus of Rupture) of High Performance CERAMICS" and the fracture toughness was determined as follows following to "Single Edge Noched Beam" method. The face of 3×40 mm of a sample having the same shape and processing precision as the sample for measuring the four point flexural strength, was the tensile face. A notch having a width of 0.1 mm, a depth of 1 mm and a length of 3 mm was cut and formed, the outer span was 30 mm, the inner span was 10 mm and the loading rate was 0.5 mm/min.

TABLE 1(a)

| | Sample No. | $Si_3N_4$ | Calculated as SrO | Calculated as MgO | Calculated as $Ce_2O_3$ | Calculated as $Y_2O_3$ | Oxides of other rare earth elements | Calculated as $ZrO_2$ |
|---|---|---|---|---|---|---|---|---|
| Present invention | No. 1 | 75.9 | 0.1 | 8.0 | | 9.0 | | 7.0 |
| | No. 2 | 84.4 | 0.2 | 0.2 | 0.2 | | | 15.0 |
| | No. 3 | 71.0 | 3.0 | 2.0 | 18.0 | | | 6.0 |
| | No. 4 | 79.3 | 17.5 | 3.0 | | 0.1 | | 0.1 |
| | No. 5 | 70.3 | 0.1 | 24.5 | 0.1 | | | 5.0 |
| | No. 6 | 73.0 | 1.5 | 2.5 | | 18.5 | | 4.5 |
| | No. 7 | 87.0 | 1.0 | 3.5 | 4.5 | | | 4.0 |
| | No. 8 | 82.5 | 0.5 | 4.0 | | 5.5 | | 7.5 |
| | No. 9 | 81.0 | 0.4 | 2.0 | 2.0 | | | 14.6 |
| | No. 10 | 81.0 | 2.0 | 2.0 | 12.0 | | | 3.0 |
| | No. 11 | 80.5 | 1.0 | 17.0 | | 0.5 | | 1.0 |
| | No. 12 | 80.5 | 0.5 | 1.0 | | 12.5 | | 5.5 |
| | No. 13 | 81.5 | 0.5 | 10.5 | | | $La_2O_3$ 4.5 | 3.0 |
| | No. 14 | 81.0 | 0.5 | 10.0 | | | $Er_2O_3$ 5.0 | 3.5 |
| Comparative example | No. 15 | 64.2 | 0.1 | 29.5 | 2.2 | | | 4.0 |
| | No. 16 | 60.5 | 1.0 | 1.5 | | 32.5 | | 4.5 |
| | No. 17 | 65.0 | 21.5 | 4.0 | 2.0 | | | 7.5 |
| | No. 18 | 62.0 | 1.0 | 7.5 | 5.0 | | | 24.5 |
| | No. 19 | 81.5 | | 8.0 | 7.5 | | | 3.0 |
| | No. 20 | 84.5 | 3.5 | | | 8.0 | | 4.0 |
| | No. 21 | 84.0 | 1.0 | 8.5 | | | | 6.5 |
| | No. 22 | 88.5 | 1.0 | 5.0 | 5.5 | | | |
| | No. 23 | 99.8 | 0.05 | 0.05 | 0.05 | | | 0.05 |
| Prior | No. 24 | 90.0 | | 10.0 | | | other oxides | |

TABLE 1(a)-continued

| | Sample No. | Si₃N₄ | Calculated as SrO | Calculated as MgO | Calculated as Ce₂O₃ | Calculated as Y₂O₃ | Oxides of other rare earth elements | Calculated as ZrO₂ |
|---|---|---|---|---|---|---|---|---|
| | | | | | Mixing ratio (%) | | | |
| sample | No. 25 | 90.0 | | | | 8.0 | Al₂O₃ 2.0 | |

TABLE 1(b)

| | Sample No. | Relative density (%) | Composition in sintered body (%) | | | | | | | Strength (kg/mm²) room temperature | Fracture toughness (MN/m^(3/2)) room temperature |
|---|---|---|---|---|---|---|---|---|---|---|---|
| | | | Sr | Mg | Ce | Y | Other rare earth elements | Zr | Si₃N₄ | | |
| Present invention | No. 1 | 97.1 | 0.1 | 4.7 | | 7.1 | | 5.1 | 75.1 | 83 | 6.1 |
| | No. 2 | 97.4 | 0.2 | 0.1 | 0.2 | | | 11.0 | 84.0 | 87 | 6.9 |
| | No. 3 | 97.3 | 2.3 | 1.2 | 14.9 | | | 4.4 | 70.3 | 89 | 6.5 |
| | No. 4 | 97.0 | 14.7 | 1.9 | | 0.1 | | 0.1 | 78.9 | 82 | 6.1 |
| | No. 5 | 97.2 | 0.1 | 14.9 | 0.1 | | | 3.7 | 70.0 | 90 | 6.6 |
| | No. 6 | 97.1 | 1.2 | 1.5 | | 14.5 | | 3.2 | 72.6 | 84 | 6.2 |
| | No. 7 | 98.2 | 0.7 | 2.2 | 3.8 | | | 3.0 | 86.8 | 99 | 7.2 |
| | No. 8 | 97.9 | 0.3 | 2.3 | | 4.4 | | 5.7 | 82.1 | 93 | 7.1 |
| | No. 9 | 98.1 | 0.3 | 1.1 | 1.7 | | | 10.8 | 80.5 | 100 | 7.4 |
| | No. 10 | 98.3 | 1.6 | 1.2 | 9.7 | | | 2.1 | 80.6 | 99 | 7.3 |
| | No. 11 | 97.8 | 0.8 | 10.2 | | 0.4 | | 0.6 | 80.4 | 94 | 7.1 |
| | No. 12 | 97.8 | 0.4 | 0.5 | | 9.9 | | 4.1 | 80.3 | 93 | 7.1 |
| | No. 13 | 97.5 | 0.3 | 6.2 | | | La 4.0 | 5.1 | 81.2 | 89 | 6.7 |
| | No. 14 | 97.4 | 0.4 | 6.0 | | | Er 4.2 | 2.7 | 80.6 | 86 | 6.4 |
| Comparative example | No. 15 | 95.9 | 0.1 | 17.8 | 1.8 | | | 3.1 | 64.1 | 68 | 5.4 |
| | No. 16 | 96.3 | 0.7 | 0.8 | | 25.6 | | 3.4 | 60.3 | 67 | 4.3 |
| | No. 17 | 96.4 | 18.3 | 2.3 | 1.7 | | | 5.7 | 64.6 | 61 | 5.8 |
| | No. 18 | 96.1 | 0.8 | 4.6 | 4.2 | | | 18.3 | 61.6 | 60 | 5.1 |
| | No. 19 | 95.8 | | 4.8 | 6.3 | | | 2.3 | 80.3 | 56 | 4.0 |
| | No. 20 | 96.0 | 2.8 | | | 6.3 | | 3.0 | 84.4 | 64 | 5.3 |
| | No. 21 | 96.2 | 0.9 | 5.1 | | | | 4.7 | 83.7 | 52 | 5.6 |
| | No. 22 | 96.3 | 0.8 | 3.1 | 4.7 | | | | 88.4 | 65 | 5.3 |
| | No. 23 | 73.4 | 0.04 | 0.02 | 0.04 | | | 0.04 | 99.6 | 34 | 3.1 |
| Prior sample | No. 24 | 96.8 | | | | | | | | 68 | 5.4 |
| | No. 25 | 96.9 | | | | | | | | 71 | 5.3 |

As seen from Table 1, the samples of the comparative examples and the prior samples are lower in bulk density and much lower in the strength and fracture toughness than silicon nitride sintered bodies of the present invention and the sintered bodies of the present invention show excellent properties.

EXAMPLE 2

By using the raw material powder of silicon nitride and the raw material powders of the sintering aids, the sintered bodies obtained by adding $ZrO_2$ in a powder form and the abrased $ZrO_2$ powder formed through abrasion of the grinding balls made of zirconia ceramics, were compared. The grinding balls made of zirconia ceramics were spherical having an outer diameter of 7 mm and having a content of $ZrO_2$ of 94.2% by weight, a content of MgO of 3.4% by weight, the remainder being $SiO_2$, $Al_2O_3$, $Fe_2O_3$, $TiO_2$, CaO and $HfO_2$, a specific gravity of 5.5 and Mohs hardness of 6.5. The pulverizing conditions, shaping conditions, firing conditions, and the like were same as those in Example 1 and the sintered bodies of Sample Nos. 26 and 27 were ones obtained by adding zirconia powder in the raw batch material and Sample Nos. 28–30 are ones obtained by adding $ZrO_2$ through abrasion of the grinding balls made of zirconia ceramics in a shorter grinding time. An amount of $ZrO_2$ mixed in the raw batch material through abrasion of the zirconia ceramics grinding balls was determined by chemically analyzing $ZrO_2$ in the pulverized powder. The properties of the sintered bodies were measured and compared and the obtained results are shown in Table 2.

TABLE 2(a)

| | Sample No. | Si₃N₄ | Calculated as SrO | Calculated as MgO | Calculated as Ce₂O₃ | Calculated as Y₂O₃ | Oxides of other rare earth elements | Calculated as ZrO₂ | Pulverized time (hour) |
|---|---|---|---|---|---|---|---|---|---|
| | | | | | Mixing ratio (%) | | | | |
| Present invention | No. 26 | 82.5 | 0.5 | 4.0 | | 5.5 | | 7.5 *1 | 300 |
| | No. 27 | 88.0 | 1.0 | 3.5 | 4.5 | | | 3.0 | 300 |
| | No. 28 | 85.1 | 1.0 | 3.4 | 4.4 | | | 6.1 *2 | 140 |
| | No. 29 | 82.6 | 0.9 | 3.3 | 4.2 | | | 9.0 | 200 |
| | No. 30 | 82.5 | 0.5 | 4.0 | | 5.5 | | 7.5 | 160 |

Note:
*1 Added ZrO₂ in powder form
*2 Introduced ZrO₂ by abrasion of grinding balls made of zirconia ceramics.

TABLE 2(b)

| | Sample No. | Relative density (%) | Composition in sintered body (%) | | | | | | | Strength (kg/mm$^2$) room temperature | Fracture toughness (MN/m$^{3/2}$) room temperature |
|---|---|---|---|---|---|---|---|---|---|---|---|
| | | | Sr | Mg | Ce | Y | Other rare earth elements | Zr | Si$_3$N$_4$ | | |
| Present invention | No. 26 | 98.0 | 0.4 | 2.3 | | 4.4 | | 5.7 | 82.4 | 93 | 7.1 |
| | No. 27 | 98.3 | 0.8 | 2.2 | 3.6 | | | 2.2 | 87.8 | 99 | 7.3 |
| | No. 28 | 99.0 | 0.9 | 2.1 | 3.7 | | | 4.5 | 84.8 | 121 | 8.2 |
| | No. 29 | 98.9 | 0.8 | 2.0 | 3.6 | | | 6.7 | 82.5 | 119 | 8.1 |
| | No. 30 | 98.6 | 0.4 | 2.4 | | 4.3 | | 5.6 | 82.3 | 114 | 7.6 |

As seen from Table 2, the sintered bodies obtained by adding ZrO$_2$ through abrasion of zirconia ceramics grinding balls are higher in strength and fracture toughness than those obtained by adding ZrO$_2$ in the powder form and show excellent properties and further, have a shorter pulverizing time and therefore are more desirable from an economic view.

As mentioned above, the present invention can provide silicon nitride sintered bodies having particularly excellent density, high mechanical strength and high fracture toughness, commercially and cheaply by utilizing the synergistic activity of four elements of Sr, Mg, a rare earth element and Zr in the amount necessary for the sintering aid even in a pressureless sintering process and the sintered bodies can be used for, for example as, engine parts, gas turbine parts, high temperature furnace material, heat resistant bearings and the like and have a very high commercial value.

What is claimed is:

1. Silicon nitride sintered bodies consisting of oxides or oxynitrides of each element of Sr, Mg, a rare earth element and Zr, said Sr, Mg and rare earth element being present in an amount 0.1-15% by weight, respectively, and said Zr being present in an amount 0.1-11% by weight, and the remainder being Si$_3$N$_4$ present in an amount which is not less than 70% by weight.

2. The silicon nitride sintered bodies as claimed in claim 1, wherein the rare earth element is selected from the group consisting of Ce and Y.

3. A method for producing silicon nitride sintered bodies, comprising combining a raw batch material consisting of compounds of Sr, Mg and a rare earth element in an amount 0.1-18% by weight calculated as SrO, an amount 0.2-25% by weight calculated as MgO, an amount 0.1-19% by weight calculated as an oxide of a trivalent rare earth element, with at least 70% by weight of a raw material powder of silicon nitride and mixing said raw batch in a zirconium grinding medium such that said zirconium grinding medium imparts into said raw batch an amount 0.1-15% by weight calculated as ZrO$_2$ as a sintering aid, shaping said mixture and pressurelessly firing the shaped mixture in an atmosphere selected from the group consisting of nitrogen and an inert gas.

4. The method as claimed in claim 3, wherein the rare earth element is selected from the group consisting of Ce and Y.

5. The product of claim 1, made by a process comprising combining a raw batch material consisting of compounds Sr, Mg and a rare earth element in an amount 0.1-18% by weight calculated as SrO, an amount 0.2-25% by weight calculated as MgO, an amount 0.1-19% by weight calculated as an oxide of a trivalent rare earth element, with at least 70% by weight of a raw material powder of silicon nitride and mixing said raw batch in a zirconium grinding medium such that said zirconium grinding medium imparts into said raw batch an amount 0.1-15% by weight calculated as ZrO$_2$ as a sintering aid, shaping said mixture and pressurelessly firing the shaped mixture in an atmosphere selected from the group consisting of nitrogen and an inert gas.

6. The method of claim 3, wherein said firing occurs in a temperature range between 1,650° C. and 1,850° C. for a period of time between 0.2 and 5.0 hours.

7. The method of claim 6, wherein said firing occurs between 1,670° C. and 1,730° C. for a period of time between 0.5 hours and 2.0 hours.

8. The method of claim 3, wherein said zirconium grinding medium comprises ZrO$_2$ balls having a diameter between 3.0 and 10.0 mm.

9. The method of claim 8, wherein the diameter of the ZrO$_2$ balls is between 4.0 and 8.0 mm.

10. The product of claim 5, wherein said firing of the shaped mixture occurs in a temperature range between 1,650° C. and 1,850° C. for a period of time between 0.2 and 5.0 hours.

11. The product of claim 10, wherein said firing of the shaped mixture occurs between 1,670° C. and 1,730° C. for a period of time between 0.5 hours and 2.0 hours.

12. The product of claim 5, wherein said zirconium grinding medium comprises ZrO$_2$ balls having a diameter between 3.0 and 10.0 mm.

13. The product of claim 12, wherein the diameter of the ZrO$_2$ balls is between 4.0 and 8.0 mm.

* * * * *